(12) United States Patent
Bradbury et al.

(10) Patent No.: US 10,713,111 B2
(45) Date of Patent: Jul. 14, 2020

(54) DAMAGE DETECTION SYSTEM

(71) Applicant: INTERNATIONAL BUSINESS MACHINES CORPORATION, Armonk, NY (US)

(72) Inventors: Jonathan D. Bradbury, Poughkeepsie, NY (US); Jonathan R. Fry, Fishkill, NY (US); Michael R. Kane, Hopewell Junction, NY (US); Jeffrey Nettey, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/825,576

(22) Filed: Nov. 29, 2017

(65) Prior Publication Data

US 2019/0163561 A1 May 30, 2019

(51) Int. Cl.
G06F 11/00 (2006.01)
G06F 11/07 (2006.01)
G06F 11/14 (2006.01)

(52) U.S. Cl.
CPC ...... *G06F 11/0796* (2013.01); *G06F 11/1441* (2013.01); *G06F 11/1471* (2013.01); *G06F 2201/86* (2013.01)

(58) Field of Classification Search
CPC .............. G06F 11/0796; G06F 11/1441; G06F 11/1471
See application file for complete search history.

(56) References Cited

U.S. PATENT DOCUMENTS

| 6,094,144 A | 7/2000 | Dishongh et al. |
| 6,366,209 B2 | 4/2002 | Dishongh et al. |

(Continued)

FOREIGN PATENT DOCUMENTS

| GB | 2421603 A | 6/2006 |
| WO | 2007038877 A1 | 4/2007 |

OTHER PUBLICATIONS

ATLAS, "ATLAS High Performance Rupture Disc Higher Pressure, High Performance", Accessed on Sep. 27, 2017, http://www.fike.com/products/atlas-high-performance-rupture-disc/, 3 pages.

(Continued)

*Primary Examiner* — Katherine Lin
(74) *Attorney, Agent, or Firm* — Michael A. Petrocelli

(57) ABSTRACT

A method includes initiating a power on sequence of a computer equipment including a plurality of sensors at a serviceable location within a component of the computer equipment, the plurality of sensors communicating with a sensor monitor coupled with an interlock mechanism, and a service console capable of communicating with the sensor monitor, receiving feedback data from the plurality of sensors during the power on sequence, each of the plurality of sensors is detecting a physical condition at the serviceable location, determining whether the feedback data exceeds a predefined threshold value, the feedback data exceeding the predefined threshold value is associated with a fault at a serviceable location, in response to the feedback data exceeding the predefined threshold value, logging the fault at the serviceable location, aborting the power on sequence of the equipment, and prompting an equipment servicer of the fault at the serviceable location.

18 Claims, 5 Drawing Sheets

(56) References Cited

U.S. PATENT DOCUMENTS

| | | | |
|---|---|---|---|
| 6,452,502 | B1 | 9/2002 | Dishongh et al. |
| 7,350,419 | B2 | 4/2008 | Lüthje et al. |
| 7,741,834 | B2 | 6/2010 | Dang et al. |
| 9,080,932 | B2 | 7/2015 | Shah et al. |
| 9,086,267 | B2 | 7/2015 | Ahmad et al. |
| 9,410,860 | B2 | 8/2016 | Shea |
| 9,443,115 | B2 | 9/2016 | Berke et al. |
| 2007/0151358 | A1 | 7/2007 | Chien et al. |
| 2009/0093191 | A1* | 4/2009 | Glide ............... B24B 5/18 451/5 |
| 2013/0241143 | A1* | 9/2013 | Nireki ............... B65H 7/02 271/265.01 |
| 2015/0127195 | A1* | 5/2015 | Cahill ............... B60T 8/1703 701/3 |
| 2015/0224845 | A1* | 8/2015 | Anderson ......... B60G 17/019 701/37 |
| 2016/0358451 | A1* | 12/2016 | Adler ............... G08B 21/24 |
| 2017/0004421 | A1 | 1/2017 | Gatson et al. |
| 2017/0030784 | A1 | 2/2017 | Mason et al. |

OTHER PUBLICATIONS

BS&B, "Reverse Buckling Disks", Rupture Disks (Bursting discs), BS&B Safety Systems, http://www.bsbsystems.com/Rupture_Disks/rupture_disks.html, Accessed on Sep. 27, 2017, 6 pages.

"Marston: Bursting Discs", Accessed on Sep. 27, 2017, http://safetysystems.valves.pentair.com/brands/marston/bursting-discs/, 11 pages.

Mell et al., "The NIST Definition of Cloud Computing", Recommendations of the National Institute of Standards and Technology, Special Publication 800-145, Sep. 2011, 7 pages.

Pending U.S. Appl. No. 15/623,934, filed Jun. 15, 2017, entitled: "Enhanced Service Procedures Using Force Measurement", 31 pages.

Pending U.S. Appl. No. 15/725,380, filed Oct. 5, 2017, entitled: "Fracture Ring Sensor", 29 pages.

Pending U.S. Appl. No. 15/720,861, filed Sep. 29, 2017, entitled: "Electro-Mechanical Fuse for Detecting Monitored Component Deflection", 26 pages.

Pending U.S. Appl. No. 15/646,138, filed Jul. 11, 2017, entitled: Optical Deformation Detection Sensor and System, 33 pages.

\* cited by examiner

DAMAGE DETECTION SYSTEM

BACKGROUND

The present invention generally relates to semiconductor package reliability monitoring, and more particularly, to a method, system and computer program product for detecting damage to a semiconductor package.

Computer equipment such as main frame computers or server boxes generally house multiple semiconductor packages in many shapes and forms. A semiconductor package generally includes a metal, plastic, glass or ceramic casing containing one or more semiconductor electronic components. The package protects the electronic components against impact and corrosion, holds contact pins or leads which are used to connect from external circuits, and dissipates internal heat.

SUMMARY

According to an embodiment of the present invention a method may include initiating a power on sequence of a computer equipment, the computer equipment includes a plurality of sensors at a serviceable location within a component of the computer equipment, the plurality of sensors communicating with a sensor monitor coupled with an interlock mechanism, and a service console capable of communicating with the sensor monitor, receiving, by the sensor monitor, feedback data from one or more of the plurality of sensors during the power on sequence, each of the plurality of sensors is detecting a physical condition at the serviceable location, determining whether the feedback data from one or more of the plurality of sensors exceeds a predefined threshold value, the feedback data exceeding the predefined threshold value is associated with a fault at a serviceable location, in response to the feedback data exceeding the predefined threshold value, logging the fault at the serviceable location, aborting the power on sequence of the equipment, and prompting, via the service console, an equipment servicer of the fault at the serviceable location.

According to another embodiment of the present invention a computer system may include one or more processors, one or more computer-readable memories, one or more computer-readable tangible storage devices, and program instructions stored on at least one of the one or more storage devices for execution by at least one of the one or more processors via at least one of the one or more memories, the computer system is capable of performing a method including: initiating a power on sequence of a computer equipment, the computer equipment includes a plurality of sensors at a serviceable location within a component of the computer equipment, the plurality of sensors communicating with a sensor monitor coupled with an interlock mechanism, and a service console capable of communicating with the sensor monitor, receiving, by the sensor monitor, feedback data from one or more of the plurality of sensors during the power on sequence, each of the plurality of sensors is detecting a physical condition at the serviceable location, determining whether the feedback data from one or more of the plurality of sensors exceeds a predefined threshold value, the feedback data exceeding the predefined threshold value is associated with a fault at a serviceable location, in response to the feedback data exceeding the predefined threshold value, logging the fault at the serviceable location, aborting the power on sequence of the equipment, and prompting, via the service console, an equipment servicer of the fault at the serviceable location.

According to another embodiment of the present invention a computer program product may include a computer readable non-transitory article of manufacture tangibly embodying computer readable instructions which, when executed, cause a computer to carry out a method including initiating a power on sequence of a computer equipment, the computer equipment includes a plurality of sensors at a serviceable location within a component of the computer equipment, the plurality of sensors communicating with a sensor monitor coupled with an interlock mechanism, and a service console capable of communicating with the sensor monitor, receiving, by the sensor monitor, feedback data from one or more of the plurality of sensors during the power on sequence, each of the plurality of sensors is detecting a physical condition at the serviceable location, determining whether the feedback data from one or more of the plurality of sensors exceeds a predefined threshold value, the feedback data exceeding the predefined threshold value is associated with a fault at a serviceable location, in response to the feedback data exceeding the predefined threshold value, logging the fault at the serviceable location, aborting the power on sequence of the equipment, and prompting, via the service console, an equipment servicer of the fault at the serviceable location.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
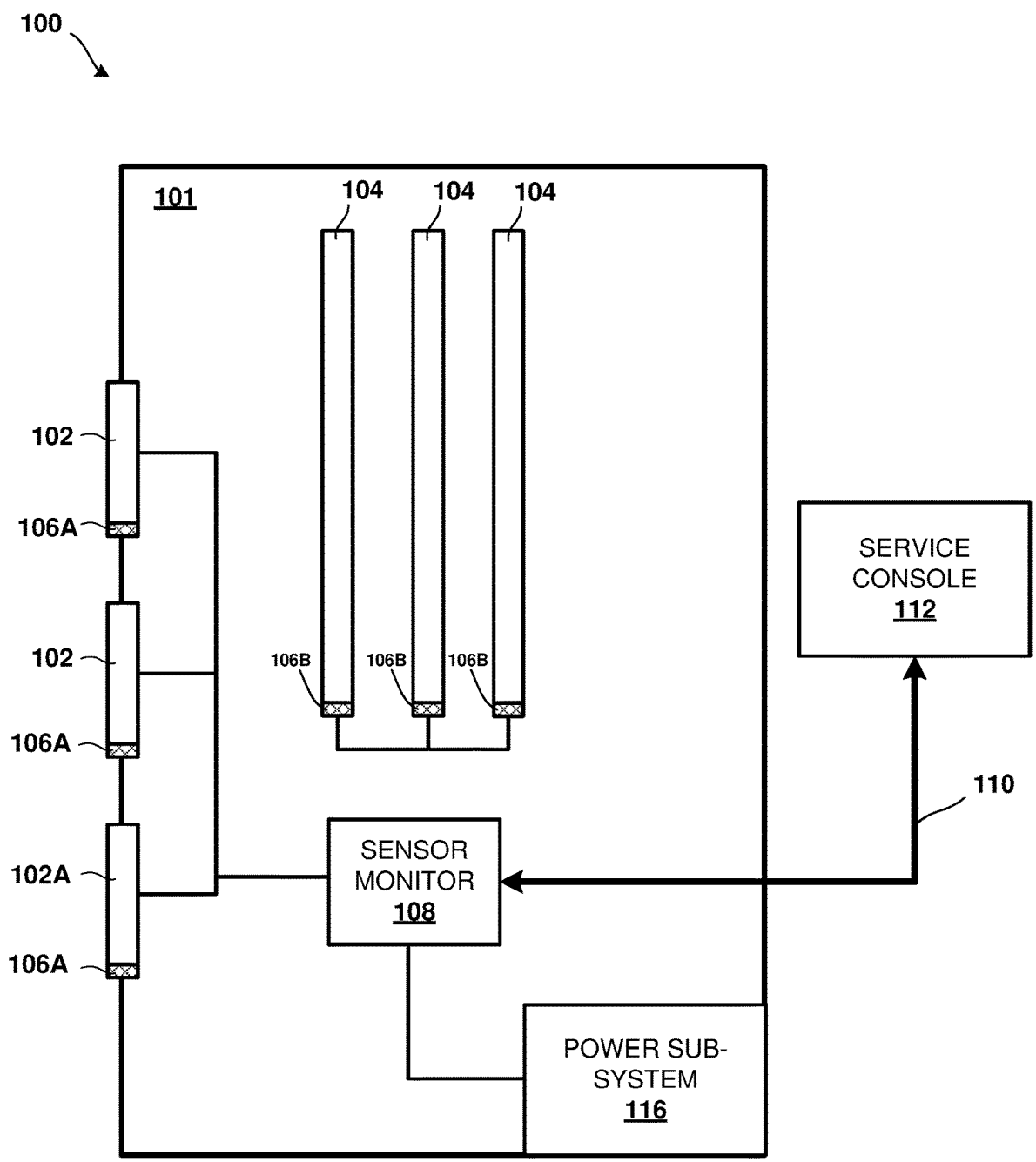
FIG. 1 is a block diagram illustrating a damage detection system, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may not be described in detail. In other instances, some processing steps or operations that are known in the art may not be described at all. It should be understood that the following description is rather focused on the distinctive features or elements of various embodiments of the present invention.

During assembly, transportation, installation, and field service, computer equipment such as main frame computers or servers, semiconductor packages within such computer equipment, may be subjected to different types of forces. Forces applied in a certain direction and above a certain threshold are known to cause damage to the semiconductor package that may not be discovered until the equipment is powered on, causing malfunction or catastrophic failure of the board (short or burnout). Such a failure can also damage surrounding components, and create potential safety issues. The primary causes of these forces may generally include: (1) over-force or over torqueing in proper direction for the insertion of sockets, cables, mounting points etc.; (2) forces applied in the wrong direction when working on the equipment (e.g. levering two things which should not have forces applied against each other, or bracing oneself against some component while exerting force on another), and/or (3) shock forces created during transport or dropping of the equipment.

Since the above problems cannot be completely eliminated or prevented, embodiments of the present invention may provide a method, system, and computer program product to (a) detect when and where in the computer equipment damage occurs (to determine liability), and (b) based on an identified damage, prevent full power on of the equipment. Thus, failure and/or permanent damage to a server or other electrical/electronic components can be prevented until proactive repairs are undertaken.

Embodiments of the present invention propose a damage detection system which may provide a way for detecting damage caused to a semiconductor package at different serviceable locations by implementing a network of internal sensors and a readout mechanism capable of identifying forces applied to the semiconductor package beyond tolerable limits (even when the system is powered off) and applying corrective steps based on feedback from the network of internal sensors. Feedback from the network of sensors may be used to identify damage to semiconductor packages that otherwise go undetected and implement one or more measures to prevent further damage. For example, if forces are detected in unexpected locations, or forces are out of acceptable tolerance limits for a given connector, the damage detection system may record a location of the detected forces, prevent the equipment from powering up and, and prompt an equipment servicer to inspect for damage and/or take appropriate corrective actions.

In embodiments of the invention, serviceable locations may include, for example, power supplies, cable connectors, printed circuit board ("PCB") connectors, computer hardware components, or other electrical and mechanical components within an item of computer equipment (e.g., server system). For example, the damage detection system may detect and indicate excessive forces having been applied to a power supply, a cable connector, or a printed circuit board connector. In other embodiments, serviceable locations may include non-electrical locations, for example, surfaces for which deflection can be measured such as a chassis frame. For example, the damage detection system may detect and indicate excessive forces having been applied to a chassis or frame of the computer equipment.

The present invention generally relates to semiconductor package reliability monitoring, and more particularly, to a method, system and computer program product for detecting damage to a semiconductor package. One way to detect damage to a semiconductor package may include coupling a network of sensors capable of detecting excessive forces at different serviceable locations with a power interlock mechanism. Embodiments by which to implement the network of sensors and power interlock mechanism are described in detailed below by referring to the accompanying drawings in FIGS. 1-5.

Referring now to FIG. 1, a functional block diagram illustrating a damage detection system 100 is shown, according to an embodiment of the present invention. In an example embodiment, the damage detection system 100 may include computer equipment 101, a console connector 110, and a service console 112.

In an example embodiment, the computer equipment 101 represents a platform to house the damage detection system 100. The computer equipment 101 may be any item of specialized electric/electronic equipment used, for example, in a commercial, consumer, government, or public setting. The computer equipment 101 may include one or more the input/output connectors 102, one or more card connectors 104, one or more sensors 106A, one or more sensors 106B, a sensor monitor 108, and a power sub-system 116. In various other embodiments, the computer equipment 101 may include a piece of complex manufacturing/assembly line equipment or a piece of complex medical equipment, such as an MRI machine. Additionally, in various other embodiments, the computer equipment 101 may include commercial, industrial, aviation, or marine equipment.

In embodiments of the invention, the input/output connector 102 represents an electrical connector through which input and output devices may be connected to the computer equipment 101. In various embodiments, the input/output connector 102 may be, for example, a power connector, a PC card adapter, an IBM GX adapter, an audio connector, a video connector, a modem, an Ethernet port, an infrared connector, a USB, a serial connector, a parallel connector, fire wire, a WiFi connector, or any other input/output connector known in the industry. In an example embodiment, three input/output connectors 102 are depicted, however, the computer equipment 101 is not limited to three input/output connectors 102. In an example embodiment, one input/output connector 102 may be a USB port, another input/output connector 102 may be an HDMI port, and yet another input/output connector 102 may be an Ethernet port.

In embodiments of the invention, card connector 104 represents an electrical connector into which a printed circuit board can be inserted to add functionality to the computer equipment 101. In various embodiments, card connector 104 may be, for example, a peripheral component interconnect ("PCI") slot, an accelerated graphics port ("AGP"), memory connectors, or any other electrical connector for PCBs known in the industry. In various other embodiments, card connector 104 may represent a bridge between critical components, rather than optional peripheral components. For example, in a cell phone with multiple printed circuit boards connected by ribbon connectors. In an example embodiment, three card connectors 104 are depicted, however, the computer equipment 101 is not limited to three card connectors 104. In an example embodiment, one card connector 104 may be a slot for RAM, another card connector 104 may be a PCI slot, and yet another card connector 104 may be another PCI slot.

In embodiments of the invention, sensors 106A-B may be configured to monitor and detect different types of forces (e.g. compressive, torqueing, shock, etc.) applied at serviceable locations within the computer equipment 101. Serviceable locations within the computer equipment 101 may be, for example, mechanical connector locations, such as input/output connector 102 and card connector 104. Serviceable locations within the computer equipment 101 may also include non-electrical connections. In various embodiments, sensors 106A-B may send back an analog signal including a physical condition (e.g. pressure, force, voltage) and/or a discrete signal (e.g. proper connection, pressure switch) at serviceable locations within the computer equipment 101. Sensors 106A-B may also detect plugs/unplugs at serviceable locations within the computer equipment 101. Sensors 106A-B may be mechanical, electrical, optical, or based on any other sensor design known in the industry for detecting physical conditions and providing feedback.

In various embodiments, sensors 106A-B may include, for example, a strain gauge mounted on a flat surface to measure deflection of that surface. Further examples may include a capacitive, acoustic, or optical sensor could measure the distance between two points to check for deflection, and an optical sensor could check for alignment.

In embodiments in which the computer equipment 101 is unpowered (e.g. during transport or service), sensors 106A-B may include any sensor capable of performing real-time force or stress monitoring and providing a hysteresis due to their mechanical nature.

In an example embodiment, one or more of the sensors 106A-B may transmit feedback to the sensor monitor 108 upon detection of a force exceeding a predefined threshold or tolerable limit at one or more serviceable locations within the computer equipment 101. In an example embodiment, the sensor 106A may monitor physical conditions at one or more input/output connectors 102 and the sensor 106B may monitor physical conditions at one or more card connectors 104.

In embodiments of the invention, the sensor monitor 108 monitors feedback from one or more sensors 106A-B within the computer equipment 101 and communicate sensor feedback to the service console 112. In an example embodiment, the sensor monitor 108 may be a microprocessor programmed to monitor feedback from sensors 106A-B, located at various serviceable locations within the computer equipment 101. The sensor monitor 108 may also be programmed to transmit, via some connection, feedback from sensors 106A-B to the power sub-system 116. Furthermore, the sensor monitor 108, may be programmed to receive data or commands from the service console 112. In an example embodiment, the sensor monitor 108 may monitor and receive feedback from sensors 106A-B relating to the physical condition of serviceable locations within the computer equipment 101. The sensor monitor 108 may also transmit, over the console connector 110, the received sensor feedback to the service console 112.

In embodiments of the invention, the sensor monitor 108 is coupled to the power sub-system 116, the power sub-system 116 may include a power interlock mechanism capable of controlling power on/off functions of the computer equipment 101. The power sub-system 116 may interpret sensor data received by the sensor monitor 108 and, in response to a detected force being above a predefined threshold, prevent powering on the computer equipment 101. In embodiments in which an excessive force is detected at one or more serviceable locations during normal run-time of the computer equipment 101, the power sub-system 116 may power off the computer equipment 101 to prevent further damage. Additionally, the power sub-system 116 may, via the service console 112, communicate a servicer to inspect the computer equipment 101 or take a corrective action.

In an embodiment of the invention, the power sub-system 116 may be a dedicated device, circuit or controller within the computer equipment 101. In another embodiment, the power sub-system 116 may be integrated within the sensor monitor 108, or other existing controller, as a software application capable of interpreting data received from one or more of sensors 106A-B within the computer equipment 101. The power sub-system 116 may be capable of communicating an action to the service console 112 via the sensor monitor 108 and the console connector 110.

It should be noted that during a Power On Self-Test (POST) or similar procedures, the sensor monitor 108 may check the status of sensors 106A-B including hysteresis or that are single use to determine if damage may have occurred while the system was powered off. The sensor monitor 108 may then take action to prevent primary power circuits of the computer equipment 101 powering on and causing further damage.

In embodiments of the invention, the console connector 110 represents a means for connection and transmission of sensor feedback data from sensors within the computer equipment 101, to the service console 112. In an embodiment, the console connector 110 may be implemented with any architecture designed for passing data and/or control information between processors (such as microprocessors) and peripheral devices. In another embodiment, the console connector 110 may be a coaxial cable, fiber optic cable, twisted pair cable, Ethernet cable or any other type of cable for sending and receiving information across a network. In an example embodiment, the console connector 110 transmits sensor feedback data from the sensor monitor 108 to the service console 112.

In yet another embodiment, the console connector 110 may be implemented through a network, such as the Internet, representing a worldwide collection of networks and gateways to support communications between devices connected to the Internet. The network may include, for example, wired, wireless or fiber optic connections. In other embodiments, the console connector 110 may be implemented as an intranet, a local area network (LAN), or a wide area network (WAN). In general, the console connector 110 can be any combination of connections and protocols that will support communications between the computer equipment 101 and the service console 112.

In embodiments of the invention, the service console 112 represents a means for displaying information from one or more sensors 106A-B, within the computer equipment 101, to an equipment servicer. The service console 112 may be implemented as a hardware management console, a desktop computer, a notebook or a laptop computer, a smart phone, a tablet computer, a handheld device, a thin client, or any other electronic device or computing system known in the art, in accordance with embodiments of the present invention, and may each include internal and external hardware components, as depicted in further detail below with reference to FIG. 3.

The service console 112 may also be capable of sending and receiving data to and from the computer equipment 101, through the console connector 110. In an example embodiment, the service console 112 may display data received from the sensor monitor 108 and the power sub-system 116, via the console connector 110. The received data may contain information from sensors 106A-B located within the computer equipment 101. Furthermore, in an example embodiment, the service console 112 may also display actions taken in response to the received data, for example, turning off the computer equipment 101 in response to an excessive stress or force detected by one or more of the sensors 106A-B during regular run-time.

Figure 2:
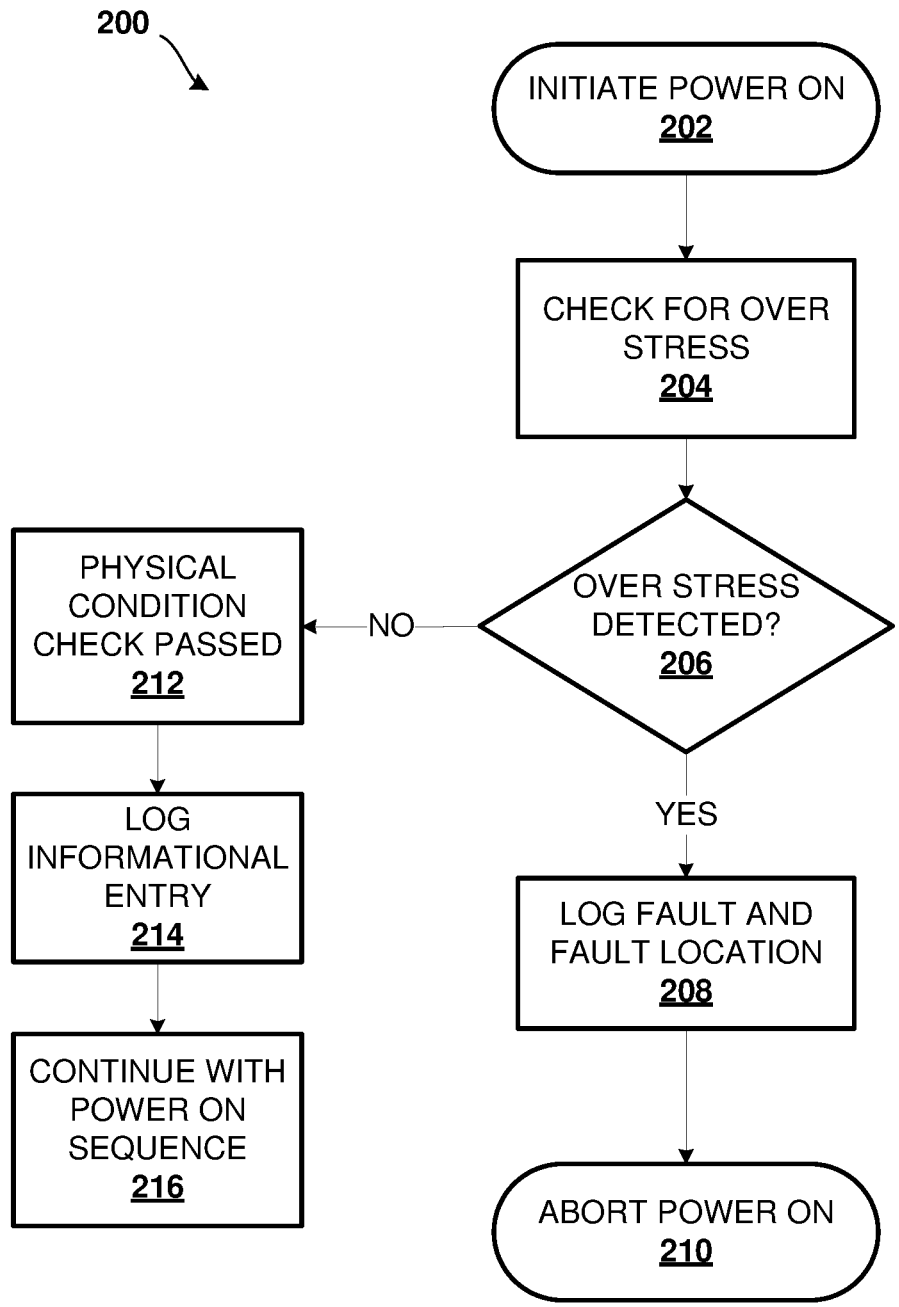
FIG. 2 is a flowchart illustrating the operations of the damage detection system of FIG. 1, in accordance with an embodiment of the invention.

Referring now to FIG. 2 a flowchart 200 illustrating the operations of the damage detection system 100 of FIG. 1 is shown, in accordance with an example embodiment.

Referring to step 202, before powering on main rails of the computer equipment 101, damage detection system 100 initiates a power on self-test (POST) or self-integrity check. Power on self-test is a generic term for any sequence of tests in a computer system that are executed before the loading of the operating system. Failure of the power on self-test usually results in an abort of the power-up sequence. It should be noted that a typical power on self-test assumes basic structural integrity of the computer system, and cannot anticipate potential catastrophic shorts/burn outs or detect damage to equipment caused by external forces.

Referring to step 204, each of the sensors 106A-B is polled for integrity. Specifically, the sensor monitor 108 receives sensor data from sensors 106A-B, and analyses the received data to identify serviceable locations within the computer equipment 101 at which over stress or forces above a tolerance limit have been applied.

Referring to step 206, the sensor monitor 108 may determine whether an excessive force has been applied at a serviceable location within the computer equipment 101, based on the received sensor data corresponding to the serviceable location. In an embodiment, a fault may exist at a serviceable location if the sensor associated with that serviceable location detects an unexpected force or detects a force which exceeds an accepted predetermined tolerance value, defined by the sensor monitor 108. In another embodiment, a fault may exist at one or more serviceable locations within the computer equipment 101, if the feedback from multiple sensors satisfies a multi-sensor consensus indicating an unexpected force, or if the combined feedback from multiple sensors exceeds a predetermined threshold or tolerance value. For example, if three of four pressure sensors detected an unexpected force at serviceable locations within the computer equipment 101.

Referring to step 208, sensor monitor 108 may communicate to the service console 112 information corresponding to the detected fault, including a type and a location of the fault. The service console 112 may then log faults and informational entries, and report them to an equipment servicer. In an embodiment, sensor monitor 108 may also communicate the fault information to the power sub-system 116.

In some embodiments, readout mechanisms may be implemented by the power sub-system 116 to communicate (via the service console 112) that a fault has occurred, for instance, an electrical readout (open indicates failure), and/or an optical readout (light indicates failure).

Then, the process continues to step 210 where the power interlock mechanism of the power sub-system 116 is activated to prevent or abort the power on sequence. The power sub-system 116 may, via the service console 112, prompt an equipment servicer to inspect the computer equipment 101 or take a corrective action. In some embodiments, the power sub-system 116 may use a diagnostic readout to isolate the fault, and identify the component(s) in question for further testing and characterization.

Alternatively, during normal run-time, sensors 106A-B may be polled periodically. Stated differently, sensors 106A-B continuously monitor serviceable locations (e.g. input/output connector 102, card connector 104) within the computer equipment 101 during regular operation. If a fault is detected during normal run-time, a shutdown or power off sequence may be initiated for the identified serviceable location or the entire the computer equipment 101, and the equipment servicer notified of the detected fault as described above.

In an embodiment, sensors 106A-B including hysteresis may be polled during the power on self-test to collect information at serviceable locations at times when the computer equipment 101 was unpowered. In another embodiment, sensors 106A-B including hysteresis may be interrogated by the sensor monitor 108 before initiating the power on sequence.

If a fault is not detected at any serviceable location, the process continues to step 212, where equipment integrity information (physical condition check passed) is received and verified. Subsequently, at step 214 equipment integrity information is logged, and the damage detection system 100 (FIG. 1) continues with the power on sequence.

Therefore, embodiments of the present invention may, among other potential benefits, provide a method, system and computer program product for detecting and acting on forces exceeding tolerable limits at specific serviceable locations using a network of sensors, detecting and logging tolerance exceeding forces at specific locations, detecting faults when equipment is powered off, and integrating logging and or a power interlock mechanism/circuit to prevent further damage or unsafe conditions when a fault is detected.

Figure 3:
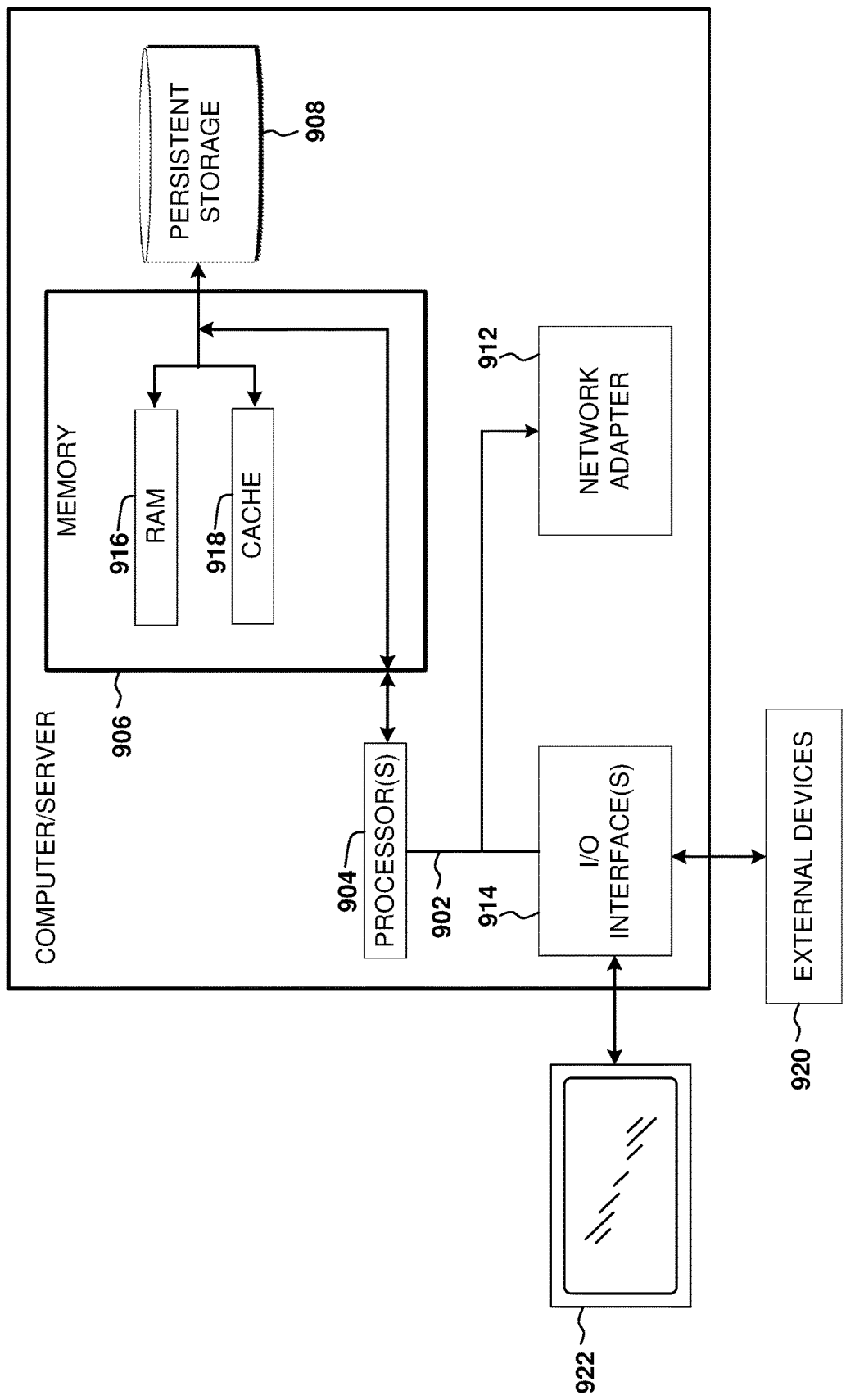
FIG. 3 is a block diagram depicting the hardware components of the damage detection system of FIG. 1, in accordance with an embodiment of the invention.

Referring now to FIG. 3 a block diagram of components of the service console 112 is shown, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

The service console 112 includes communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links.

I/O interface(s) 914 allows for input and output of data with other devices that may be connected to the service console 112. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
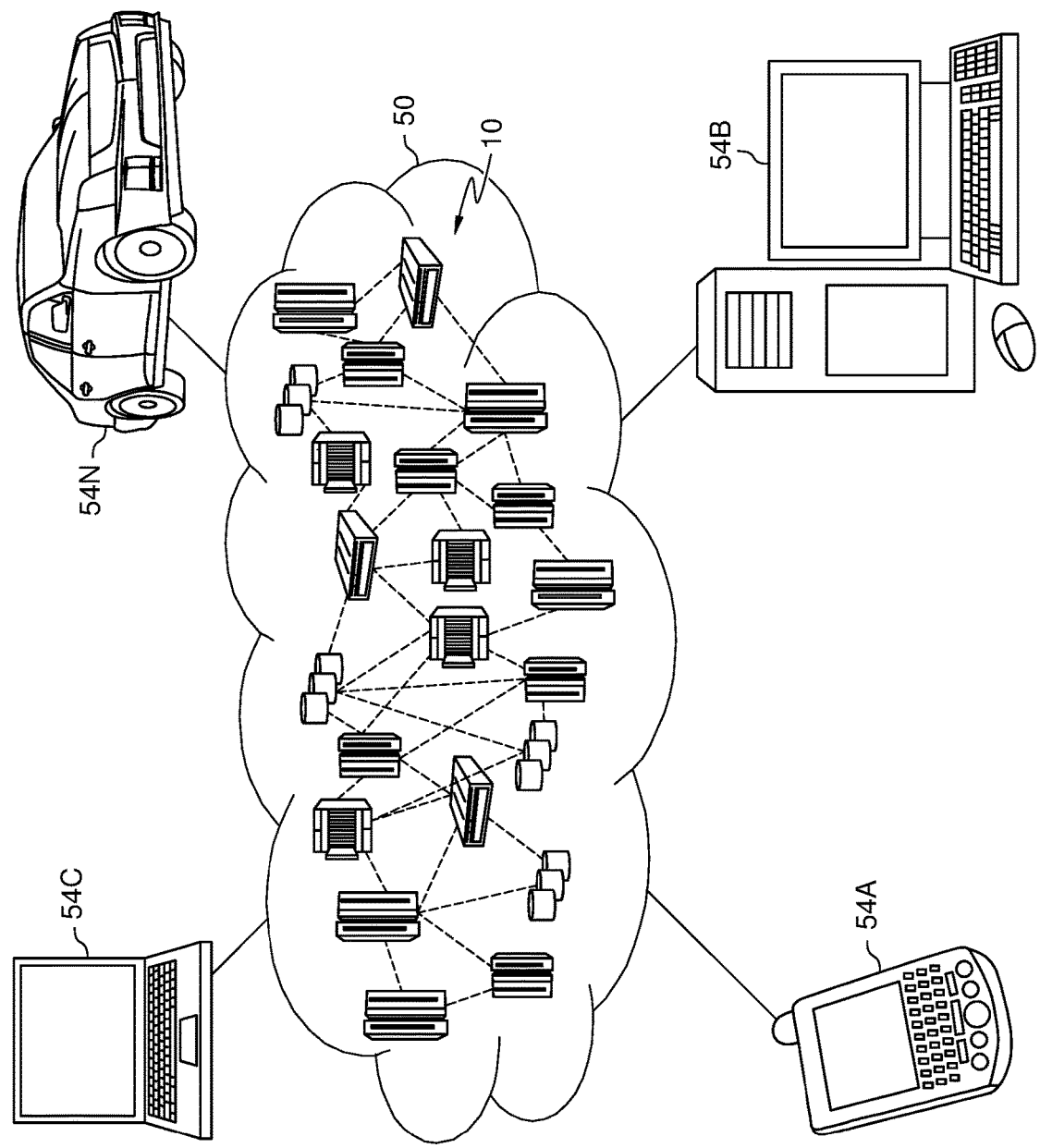
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
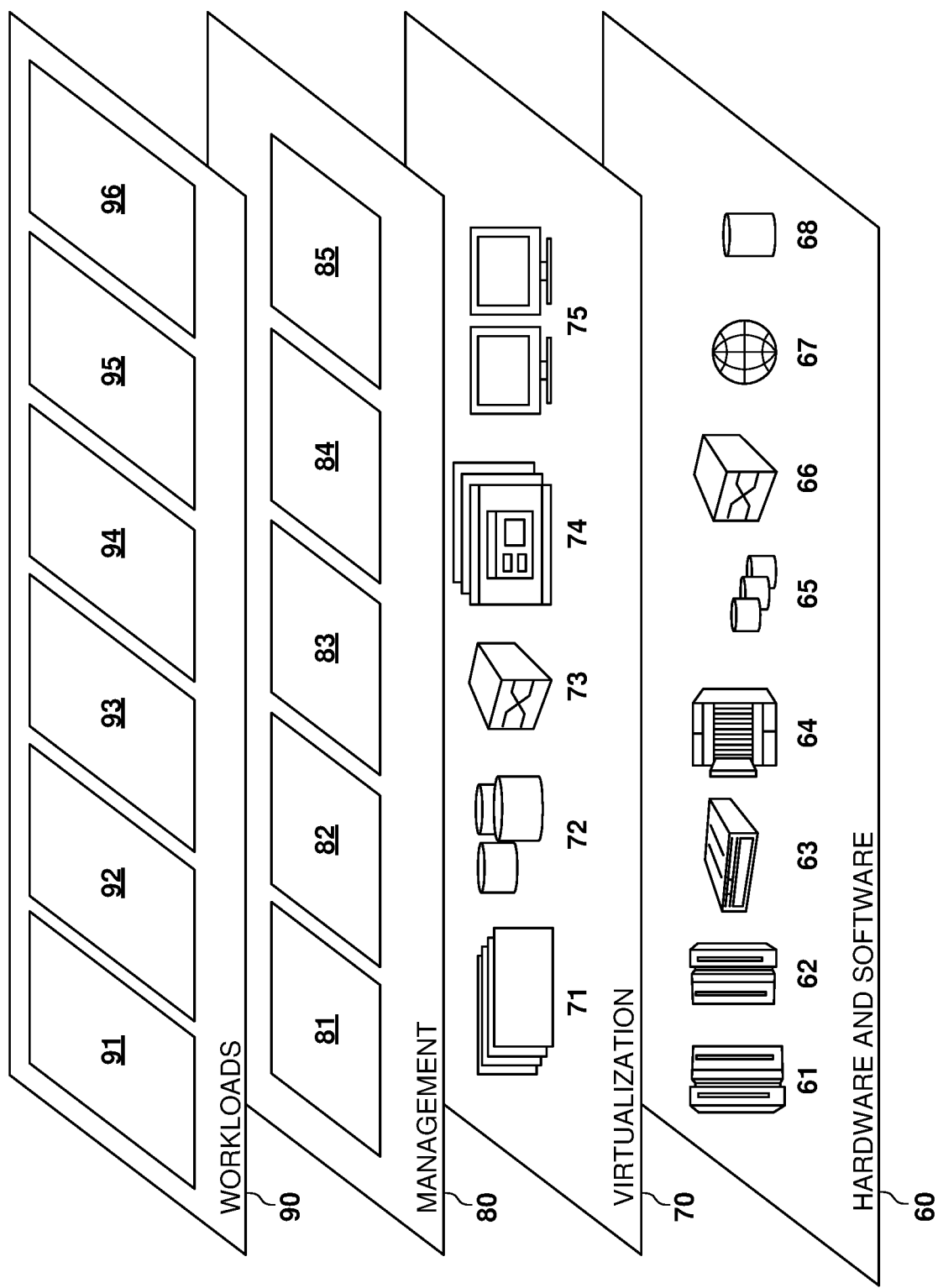
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and physical condition detection system 96. Physical condition detection system 96 may relate to monitoring sensor feedback from sensors located within an item of equipment and suggesting possible action based on the sensor feedback.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method comprising:
    initiating a power on sequence of a computer equipment comprising:
        first sensors connected to a plurality of card connectors and second sensors connected to a plurality of input/output connectors, the first sensors and second sensors communicating with a sensor monitor coupled with a power sub-system comprising an interlock mechanism, and a service console capable of communicating with the sensor monitor, the plurality of card connectors and the plurality of input/output connectors comprising serviceable locations of the computer equipment;
    receiving, by the sensor monitor, feedback data from the first sensors and the second sensors during the power on sequence, the feedback data comprising information regarding a physical condition of the computer equipment after a force is applied to the serviceable locations;
    determining whether the feedback data from the first sensors and the second sensors exceeds a predefined threshold value associated with a tolerable force limit, wherein the feedback data exceeding the predefined threshold value is associated with a fault in at least one of the serviceable locations;
    in response to the feedback data exceeding the predefined threshold value, logging the fault identified in the at least one serviceable location;
    aborting the power on sequence of the equipment; and
    prompting, via the service console, an equipment servicer of the fault in the at least one serviceable location.

2. The method of claim 1, further comprising:
in response to the feedback data being below the predefined threshold value, logging informational entries; and
continuing the power on sequence of the computer equipment.

3. The method of claim 1, wherein each input/output connector represents an electrical connector through which input and output devices are connected to the computer equipment, and each card connector represents an electrical connector into which a printed circuit board can be inserted to add functionality to the computer equipment.

4. The method of claim 1, wherein the information regarding the physical condition of the computer equipment comprised in the feedback data further comprises:
determining changes in the computer equipment associated with the applied force, a stress, an alignment, a voltage, and a connection state.

5. The method of claim 1, wherein the first sensors and the second sensors comprise mechanical, electrical, or optical sensors capable of detecting real-time physical conditions of the computer equipment and providing feedback.

6. The method of claim 1, wherein the first sensors and the second sensors provide a hysteresis that allows detecting physical conditions when the computer equipment is unpowered.

7. The method of claim 1, wherein the computer equipment further comprises a readout mechanism to communicate that a fault has occurred, the readout mechanism comprising an electrical readout and an optical readout.

8. The method of claim 1, further comprising:
detecting the fault at the at least one serviceable location during a normal run-time of the computer equipment; and
based on the detected fault, powering off the computer equipment.

9. A computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
initiating a power on sequence of a computer equipment comprising:
first sensors connected to a plurality of card connectors and second sensors connected to a plurality of input/output connectors, the first sensors and second sensors communicating with a sensor monitor coupled with a power sub-system comprising an interlock mechanism, and a service console capable of communicating with the sensor monitor, the plurality of card connectors and the plurality of input/output connectors comprising serviceable locations of the computer equipment;
receiving, by the sensor monitor, feedback data from the first sensors and the second sensors during the power on sequence, the feedback data comprising information regarding a physical condition of the computer equipment after a force is applied to the serviceable locations;
determining whether the feedback data from the first sensors and the second sensors exceeds a predefined threshold value associated with a tolerable force limit, wherein the feedback data exceeding the predefined threshold value is associated with a fault in at least one of the serviceable locations;
in response to the feedback data exceeding the predefined threshold value, logging the fault identified in the at least one serviceable location;
aborting the power on sequence of the equipment; and
prompting, via the service console, an equipment servicer of the fault in the at least one serviceable location.

10. The computer system of claim 9, further comprising:
in response to the feedback data being below the predefined threshold value, logging informational entries; and
continuing the power on sequence of the computer equipment.

11. The computer system of claim 9, wherein each input/output connector represents an electrical connector through which input and output devices are connected to the computer equipment, and each card connector represents an electrical connector into which a printed circuit board can be inserted to add functionality to the computer equipment.

12. The computer system of claim 9, wherein the information regarding the physical condition of the computer equipment comprised in the feedback data further comprises:
determining changes in the computer equipment associated with the applied force, a stress, an alignment, a voltage, and a connection state.

13. The computer system of claim 9, wherein the first sensors and the second sensors comprise mechanical, electrical, or optical sensors capable of detecting real-time physical conditions of the computer equipment and providing feedback.

14. The computer system of claim 9, wherein the first sensors and the second sensors provide a hysteresis that allows detecting physical conditions when the computer equipment is unpowered.

15. The computer system of claim 9, wherein the computer equipment further comprises a readout mechanism to communicate that a fault has occurred, the readout mechanism comprising an electrical readout and an optical readout.

16. The computer system of claim 9, further comprising:
detecting the fault at the at least one serviceable location during a normal run-time of the computer equipment; and
based on the detected fault, powering off the computer equipment.

17. A computer program product comprising:
a computer readable non-transitory article of manufacture tangibly embodying computer readable instructions which, when executed, cause a computer to carry out a method comprising:
initiating a power on sequence of a computer equipment comprising:
first sensors connected to a plurality of card connectors and second sensors connected to a plurality of input/output connectors, the first sensors and second sensors communicating with a sensor monitor coupled with a power sub-system comprising an interlock mechanism, and a service console capable of communicating with the sensor monitor, the plurality of card connectors and the plurality of input/output connectors comprising serviceable locations of the computer equipment;
receiving, by the sensor monitor, feedback data from the first sensors and the second sensors during the power on sequence, the feedback data comprising information regarding a physical condition of the computer equipment after a force is applied to the serviceable locations;

determining whether the feedback data from the first sensors and the second sensors exceeds a predefined threshold value associated with a tolerable force limit, wherein the feedback data exceeding the predefined threshold value is associated with a fault in at least one of the serviceable locations;

in response to the feedback data exceeding the predefined threshold value, logging the fault identified in the at least one serviceable location;

aborting the power on sequence of the equipment; and prompting, via the service console, an equipment servicer of the fault in the at least one serviceable location.

18. The computer program product of claim 17, further comprising:

detecting the fault at the at least one serviceable location during a normal run-time of the computer equipment; and based on the detected fault, powering off the computer equipment.

* * * * *